United States Patent
Wu

(10) Patent No.: US 6,589,075 B1
(45) Date of Patent: Jul. 8, 2003

(54) DEVICE FOR RAPIDLY ASSEMBLING LAMP ROD AND LAMP SEAT

(76) Inventor: Wen-Chang Wu, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 10/025,435

(22) Filed: Dec. 26, 2001

(51) Int. Cl.[7] .............................................. H01R 13/73
(52) U.S. Cl. ...................... 439/550; 439/544; 439/535; 439/948
(58) Field of Search ................................. 439/550, 535, 439/538, 544, 539, 541, 948; 174/48

(56) References Cited

U.S. PATENT DOCUMENTS 5,967,837 A * 10/1999 Wolfe et al. ................ 439/550
6,123,578 A * 9/2000 Truett ......................... 439/550
6,193,548 B1 * 2/2001 Sigl et al. .................... 439/550

* cited by examiner

*Primary Examiner*—Tho D. Ta

(57) ABSTRACT

A device for rapidly assembling a lamp rod and a lamp seat comprises a lamp seat in a though hole aside a wire connecting box and a lamp rod inserted into the lamp seat. An extending portion is extended from the lamp seat to the though hole. The lamp seat is positioned within the wire connecting box. A limiting sheet is positioned at the lateral side of the lamp seat toward the center of the wire connecting box. The limiting sheet has a recess portion. A front end of the lamp rod has a male joint. After the lamp rod is inserted into the lamp seat; the male joint is exactly engaged with a female joint of the lamp seat so as to conduct power. The user is only necessary to insert the lamp rod into the lamp seat. No stud is necessary.

4 Claims, 4 Drawing Sheets

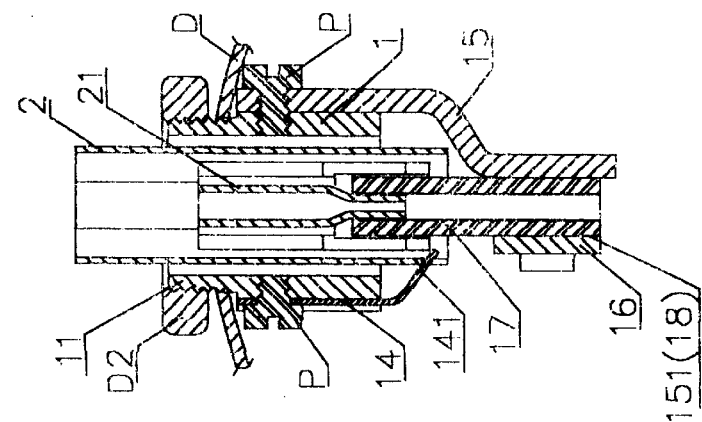
FIG3-C
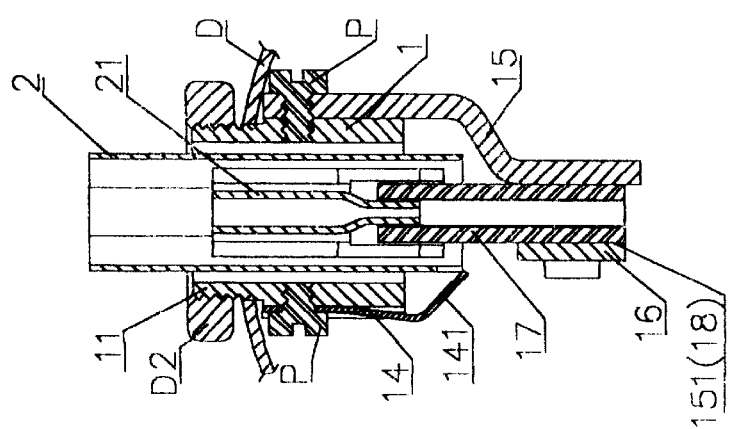
FIG3-B
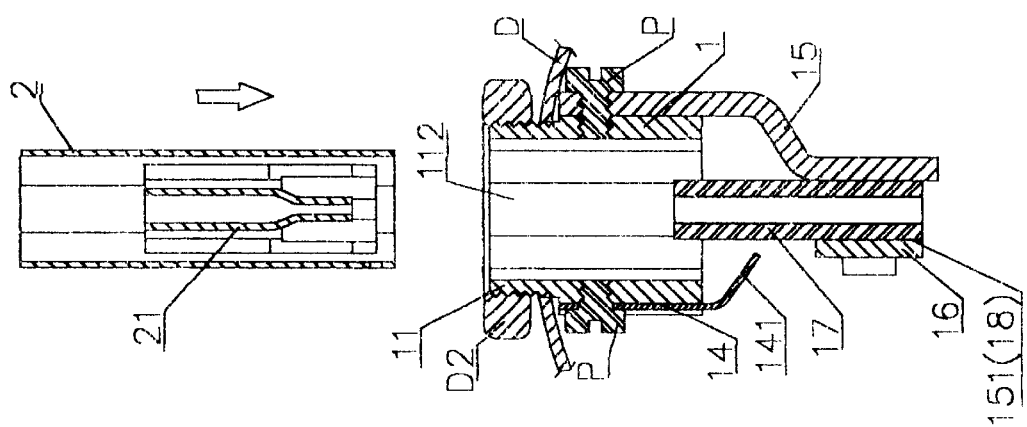
FIG3-A

DEVICE FOR RAPIDLY ASSEMBLING LAMP ROD AND LAMP SEAT

BACKGROUND OF THE INVENTION

1. Field of the Invention

The present invention relates to connection structures, and particularly to a device for rapidly assembling a lamp rod and a lamp seat. Thereby, the user is only necessary to insert the lamp rod into the lamp seat. No stud is necessary.

2. Description of the Related Art

The prior art conductive connecting device for connecting a lamp rod and a lamp seat of a lamp, such as a wall lamp, a bracket lamp, or a standing lamp, etc., uses studs and nuts to connect the two components. It is not only that the lamp is easily to be collided in assembly, but also the other hand tool (for example, a spanner, an opener, etc.) is necessary in assembly. Moreover, the friction in assembly will cause the electric wire to expose out so as to induce some dangerous conditions. Therefore, it is unsuitable to be assembled by the user and thus the manufacturers must assembly the wire connecting box and the lamp rod in advance for sale. However, this will increase the cost.

SUMMARY OF THE INVENTION

Accordingly, the primary object of the present invention is to provide a device for rapidly assembling a lamp rod and a lamp seat. The device comprises a lamp seat in a though hole aside a wire connecting box and a lamp rod inserted into the lamp seat.

An extending portion with threads on an outer surface is extended from a lateral side of the lamp seat to an exterior of the though hole of the wire connecting box. The extending portion has an extending hole. A positioning ring is engaged to the extending portion at a portion out of a though hole. Thereby, the lamp seat is positioned at an inner side of the wire connecting box. A limiting sheet is positioned at the lateral side of the lamp seat toward the center of the wire connecting box. The limiting sheet has a recess portion at a center of the limiting sheet corresponding to an inserting hole of the lamp seat. An upper and a lower end of the recess are extended with respective locking pieces. Another end of the locking piece is exactly locked with a retaining piece; a space is formed between the recess and the retaining piece;

A front end of the lamp rod has a male joint for power conduction. After the lamp rod is inserted into the lamp seat. The male joint at the front end is exactly engaged with the female joint of the lamp seat so as to conduct power.

In assembly, the user is only necessary to insert the lamp rod into the lamp seat in the wire connecting box. No stud is necessary. The user may assemble the present invention by himself (or herself).

The various objects and advantages of the present invention will be more readily understood from the following detailed description when read in conjunction with the appended drawing.

BRIEF DESCRIPTION OF THE DRAWINGS

FIG. 3–A is a plane cross sectional view of the present invention before inserting a lamp rod.

FIG. 3–B is a plane cross sectional view of the present invention, wherein the lamp rod is inserting into the lamp seat.

FIG. 3–C is a plane cross sectional view of the present invention, wherein the lamp rod has inserted into the lamp seat.

DETAILED DESCRIPTION OF THE PREFERRED EMBODIMENTS

Figure 1:
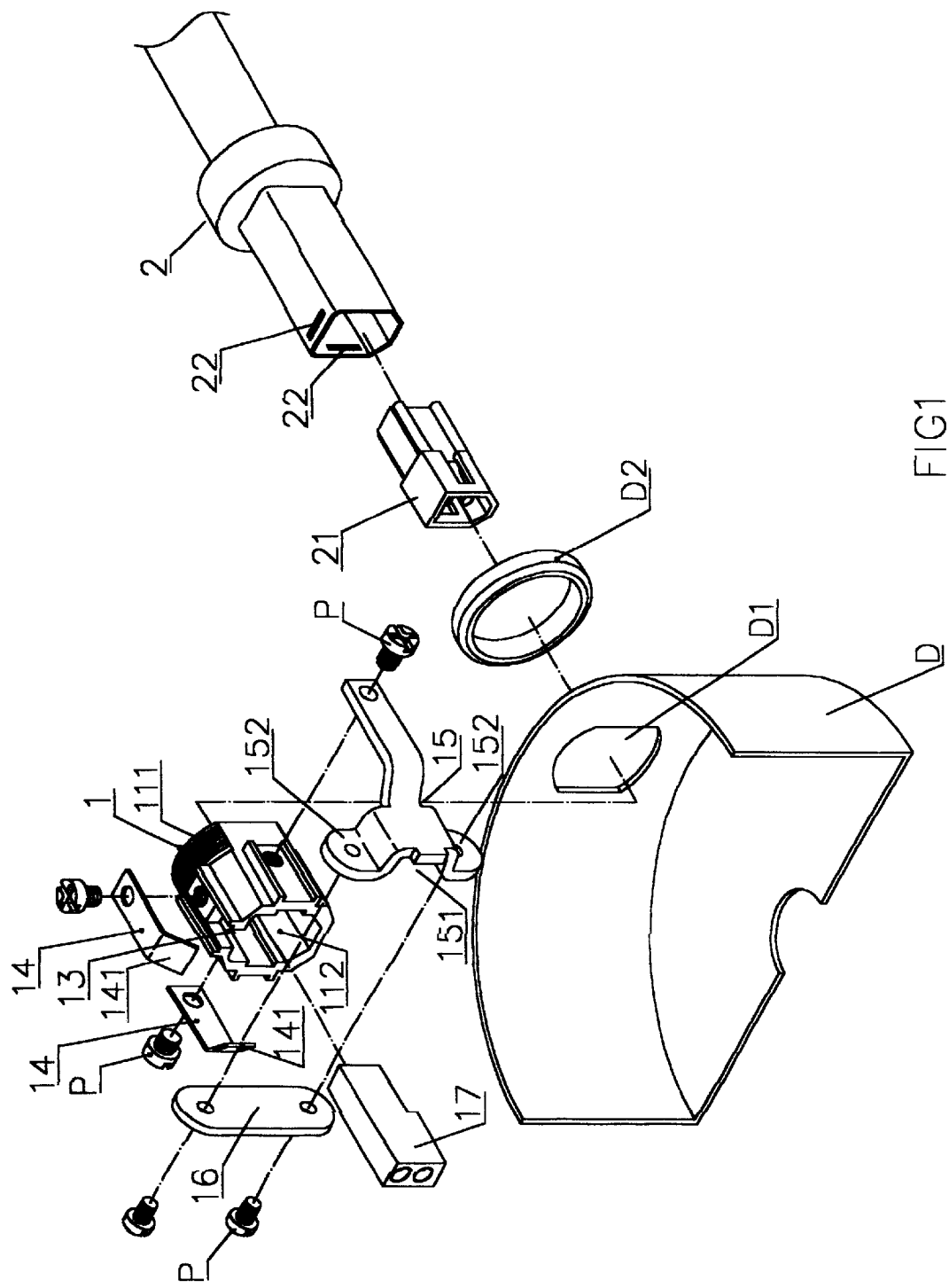
FIG. 1 is an exploded perspective view of the present invention.
Figure 2:
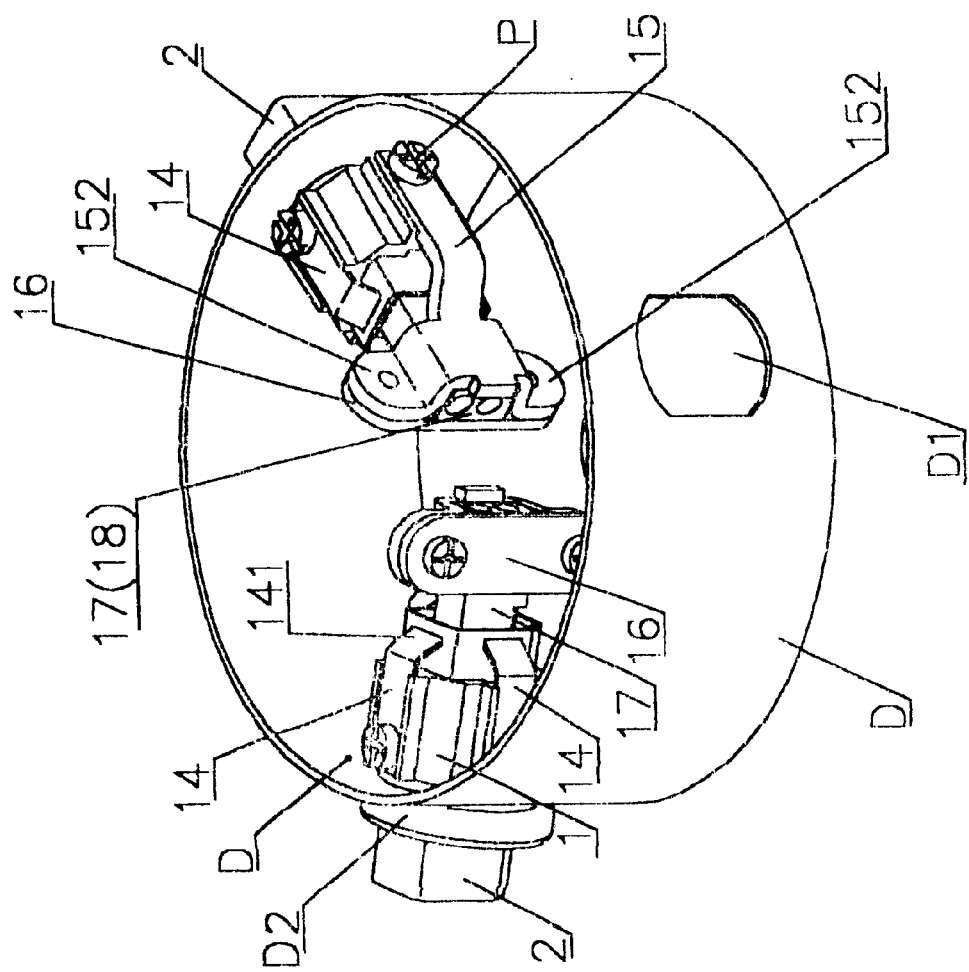
FIG. 2 is a perspective view of the present invention.

Referring to FIG. 1 and 2, the retaining seat of a wire detaching box of the present invention is illustrated. The retaining seat of a wire detaching box includes a lamp seat 1 on the though hole D1 aside the wire connecting box D and a lamp rod 2 inserted into the lamp seat 1.

An extending portion 11 with threads on the outer surface is extended from a lateral side of the lamp seat 1 to the exterior of the though hole D1 of the wire connecting box D. The extending portion 11 has an extending hole 112. A positioning ring D2 is engaged to the extending portion 11 at the portion out of the though hole D1. Thereby, the lamp seat 1 can be positioned at an inner side of the wire connecting box D. A top surface of the lamp seat 1 has a platform 12 with a via hole 13 at a front side thereof. The platform 12 is locked with a reed 14. An engaging end 141 extends downwards from the reed 14 so that the engaging end exactly protrudes to the upper side of the via hole 13.

A limiting sheet 15 is locked at the lateral side of the lamp seat 1 toward the center of the wire connecting box D by a stud P. The limiting sheet 15 has a recess portion 151 at the center of the limiting sheet 15 corresponding to an inserting hole 111 of the lamp seat 1. The upper and lower ends of the recess 151 are extended with respective locking pieces 152. Another end of the locking piece 152 is exactly locked with a retaining piece 16. A space 18 is formed between the recess 151 and the retaining piece 16 for being inserted by the female joint 17.

A front end of the lamp rod 2 has a male joint 21 for power conduction. After the lamp rod inserts into the lamp seat, the male joint 21 at the front end is exactly engaged with the female joint 17 of the lamp seat 1 so as to conduct power. Buckle holes 22 are in the top surfaces of the lamp rod 2. Thereby, when the lamp rod 2 inserts into the inserting hole 111 of the lamp seat 1, the buckle holes 22 in the surface are exactly engaged with the engaging end 141 of the reed 14.

With reference to FIG. 3, by the reed 14 locking to the platform 12 of the lamp seat 1, the engaging end 141 is inclined and protrudes into the via hole 13 of the platform. Thereby, when the lamp rod 2 inserts into the lamp seat 1, the buckle holes 22 at the end of the lamp rod 2 exactly resists against the lower side of the extending end 141 of the reed 14 so that the lamp rod 2 is exactly confined by the lamp seat 1. Now, the male joint 21 inserted into the lamp rod 2, the male joint 21 on the lamp rod 2 is exactly engaged with the female joint 17 in the receiving space 18. Thereby, the lamp seat 1 is conductive with the lamp rod 2.

Figure 4:
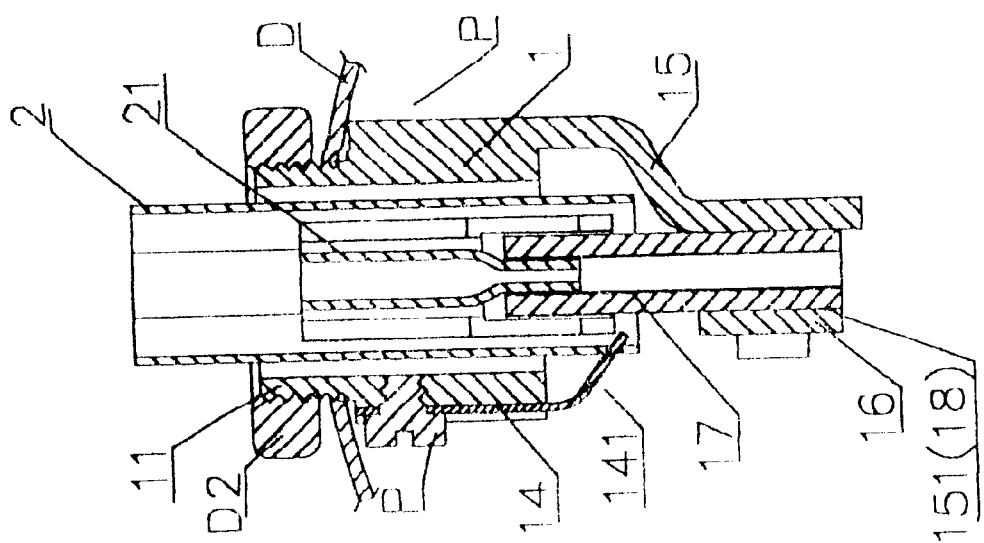
FIG. 4 is a plane cross sectional view showing the integral formed limiting sheet of the present invention.

Referring to FIG. 4, another embodiment of the present invention is illustrated. The limiting sheet 15 aside the lamp seat 1 is integrally formed with the lamp seat 1.

The lamp seat 1 inserting into the lamp rod 2 is installed in the wire connecting box D in advance. In assembly, the user is only necessary to insert the lamp rod 2 into the lamp seat 1 in the wire connecting box D. No stud is necessary. The user may assemble the present invention by himself (or herself).

In the present invention, the extending portion of the wire connecting box is selected from one of a group containing a triangular, a rectangular, a pentagon, and a polygon.

The present invention are thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A quick connection device comprising:

a lamp seat having an inserting hole to receive one end of a female joint the lamp seat is located in a though hole of a wire connecting box;

a lamp rod having a male joint at a front end thereof for power conduction; an extending portion with theads on an outer surface thereof being extended from one end of the lamp seat to an exterior of the though hole of the wire connencting box;

a positioning ring being engaged to the threads of the extending portion adjacent an outer surface of the wire connection box for holding the lamp seat at the through hole;

the other end of the lamp seat being positioned at an inner side of the wire connecting box;

a limiting sheet being attached to the lateral side of the other end of the lamp seat toward an inner surface of the wire connecting box; the limiting sheet having a recess portion at a center of the limiting sheet extended toward the center line of the inserting hole of the lamp seat and corresponding to the inserting hole of the lamp seat; an upper and a lower end of the recess being extended with respective locking pieces; each end of the locking pieces being locked with a retaining piece; a space being formed between the recess and the retaining piece for holding the other end of the female joint;

wherein after the lamp rod being inserted into the lamp seat; the male joint at the front end of the lamp seat being exactly engaged with the one end of the female joint of the lamp seat so as to conduct power; and wherein a top surface of the lamp seat has a platform with a via hole at a front side thereof; the platform is locked with a reed; an engaging end extends downwards from the reed so that the engaging end exactly protrudes to an upper side of the via hole; and buckl holes are formed in surfaces of the lamp rod; thereby, when the lamp rod inserts into the inserting hole of the lamp seat; the buckle holes in the surface are exactly engaged with the engaging end of the reed in order to limit the insertion depth of the lamp rod.

2. The device as claimed in claim 1, wherein the limiting piece at the lateral side of the lamp seat is fixed by a stud.

3. The device as claimed in claim 1, wherein the limiting piece at the lateral side of the lamp seat is directly formed with the lamp seat.

4. The device as claimed in claim 1, wherein the extending portion of the wire connecting box is selected from one of a group containing a triangular, a rectangular, a pentagon, and a polygon.

* * * * *